Aug. 28, 1945.     H. J. DOBMEIER ET AL     2,383,779
AIRCRAFT CONTROL MEANS
Filed May 14, 1942
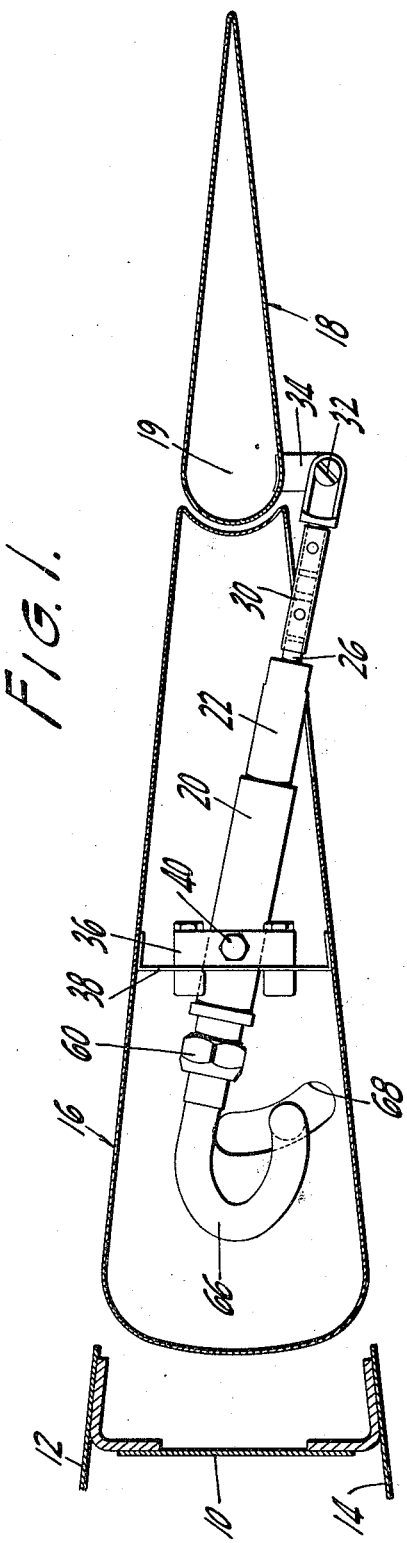
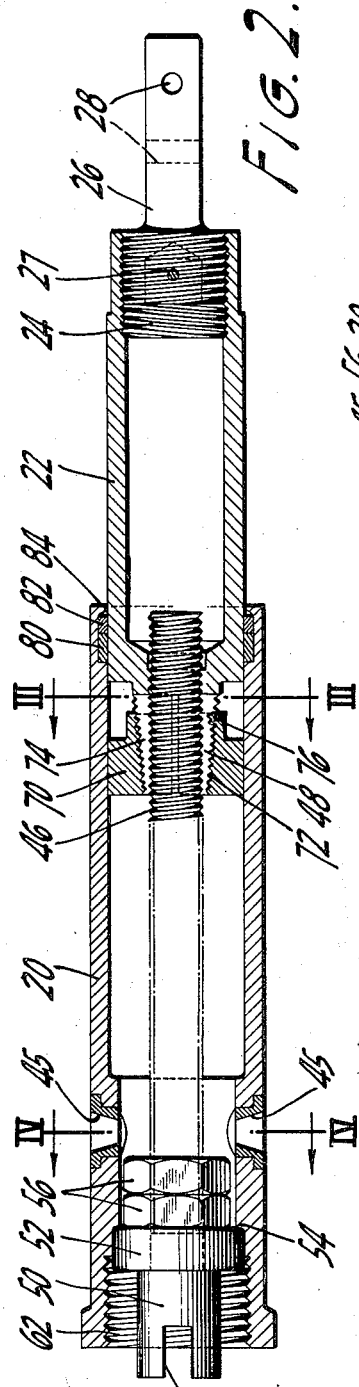
INVENTORS
HAROLD J. DOBMEIER &
GERALD A. WEINGARTNER
BY
Beau, Brooks, Buckley & Beau.
ATTORNEYS Patented Aug. 28, 1945

2,383,779

UNITED STATES PATENT OFFICE 2,383,779

AIRCRAFT CONTROL MEANS

Harold J. Dobmeier and Gerald A. Weingartner, Buffalo, N. Y., assignors to Bell Aircraft Corporation, Buffalo, N. Y.

Application May 14, 1942, Serial No. 442,906

4 Claims. (Cl. 244—82)

This invention relates to aircraft, and more particularly to improved control surface actuating means therefor.

It is well known that "fluttering" of aircraft control surfaces is productive of highly undesirable vibrational effects, and that lost motion within the control surface actuating system will usually permit such fluttering. One of the objects of the present invention is to provide an improved control surface actuating system wherein the operating parts are of standardized design and construction and are adapted to be fabricated and assembled in connection with a large scale manufacturing operation with utmost facility. Another object of the present invention is to provide an improved control surface actuating mechanism of the character described incorporating a screw-thread connection device which enables the mechanism to be adjusted upon final assembly, in an improved manner. Another object of the present invention is to provide a control surface actuating mechanism of the character described wherein the screw adjustment device thereof is of improved form so as to avoid lost motion therein such as would otherwise introduce "fluttering" tendencies into the control system. Other objects and advantages of the invention will appear in the specification hereinafter.

In the drawing:

Fig. 1 is a section through an aircraft control surface system, such as an elevator and trim tab arrangement at the empennage of an airplane having an actuating mechanism of the invention in connection therewith;

Fig. 2 is a longitudinal section through a portion of the trim tab actuating mechanism of Fig. 1;

Fig. 3 is a section along line III—III of Fig. 2; and

Fig. 4 is a section along line IV—IV of Fig. 2.

The drawing illustrates the invention in connection with the control surface system of a modern high performance type airplane, wherein 10 designates the rear spar member of the stabilizer at the empennage of the airplane. The upper and lower stabilizer covering portions are indicated at 12 and 14, respectively. The elevator is designated generally at 16; and it will be understood that the elevator will usually be hingedly mounted relative to the stabilizer structure by means of any suitable hinge connection (not shown). The trim tab is indicated generally at 18 as being of typical airfoil form; and it will be understood that the trim tab will be hingedly mounted relative to the rear end portion of the elevator 16 by means of suitable hinge connection devices (not shown) having a common rotation axis which is indicated at 19.

The control surface actuating mechanism of the invention is illustrated in the drawing as being arranged to operate the trim tab 18 relative to the elevator 16. The actuating mechanism is illustrated as comprising a cylindrical housing member 20 and a tubular push-pull member 22 which is telescopically inserted at one of its ends within the corresponding end portion of the housing 20. At its opposite end the push-pull member 22 is interiorly threaded at 24 to receive in screwthreaded connected relation one end of a stud 26. A pin 27 fixes the stud relative to the member 22 and the stud is drilled as at 28 for connection with a push-pull rod 30 which in turn connects by means of a pivot connection device 32 with a horn 34 extending laterally from the trim tab 18. Thus, push-pull operation of the tubular push-pull member 22 will cause the trim tab 18 to be rotated about the axis 19 for elevator control purposes as will be understood by those skilled in the art.

The housing 20 is pivotally mounted upon the frame of the elevator 16 by means of a bracket 36 which is bolted to a framing member 38 of the elevator structure. The bracket 36 carries at its opposite sides a pair of cap screws 40—40 which, as illustrated in Fig. 4, are threaded through corresponding side portions 42—42 of the bracket 36 so as to have their inner end portions 44—44 extending to pivotally engage within bushings 45 carried by correspondingly recessed opposite side portions of the housing 20. Thus, the housing 20 is journaled upon the screws 40—40 for free pivotable movement about an axis extending through the centers of the screws, but the housing 20 is firmly held thereby against displacement in directions longitudinally of the housing.

To actuate the push-pull member 22 relative to the housing 20 for operation of the trim tab 18, a screw 46 is mounted within the housing so as to extend into screwthreaded connection relation within a bored and tapped stub portion 48 of the push-pull member 22. At its opposite end the screw 46 is formed with an enlarged head 50, and a combination end thrust and centering bearing device 52 is mounted upon the reduced diameter screw portion so as to abut the shoulder of the enlarged head 50. The outer race of the bearing 52 is proportioned to fit snugly into a bored portion of the housing behind a shoulder 54 thereof, and a pair of jam nuts 56—56 are threaded upon the screw 46 so as to jam the inner race of the bearing 52 against the screw head 50. A screw gland 60 (Fig. 1) is arranged to be threaded into a counterbored and tapped end portion 62 of the housing 20 for pressing against the outer race of the bearing 52 and clamping it against the shoulder 54 of the housing. Thus, upon final assembly of the mechanism the bearing 52 is maintained firmly against displacement relative to the housing 20 in all directions, while the screw 46 is rotatably mounted by means of the bearing 52 so as to be freely rotatable relative to the push-pull member 22 for screwing adjustments of the screw 46 relative to the push-pull member.

The screw head 50 is slotted at 64 to receive in keyed relation therewith a complementarily shaped end portion of a control power supply device, such as a flexible drive shaft as indicated at 66 (Fig. 1). It will be understood that the drive shaft 66 will have a key shaped end coupling device extending interiorly of the gland 60 for connection with the screw head slot 64, and that the cable will extend therefrom through suitably apertured portions of the aircraft structure, as indicated at 68, into operative connection with the pilot control member for the trim tab mechanism; and that the pilot control member referred to may comprise any suitable form of control device located within convenient reach of the aircraft pilot.

To insure a snug screw thread connection between the actuating screw 46 and the push-pull member 22 under all conditions of operation so as to avoid introduction of "flutter" producing lost motion effects within the screwthread connection, a clamping nut 70 is mounted upon the exterior of the stub portion 48 of the push-pull member 22. As illustrated in Fig. 2, the exterior surface of the stub portion 48 is arranged to be of generally conical form and taper-threaded as indicated at 72 to mount in screwthreaded relation thereon the nut 70 which is taper-tapped in complementary fashion. Consequently, subsequent to mounting of the screw 46 in threaded relation within the stub portion 48 of the push-pull member 22 the nut 70 may be threaded upon the stub portion 48 and forced thereon so as to squeeze the stub portion 48 into tightly clamped relation upon the screw 46.

Because the squeezing action which is generated by the nut 70 depends upon the degree to which the latter is force-threaded upon the stub portion, the fit between the screw 46 and the push-pull member 22 may be very delicately adjusted. Hence, a minute adjustment may be made in the case of each unit subsequent to assembly of the screw and push-pull parts to compensate for irregularities in the processes of manufacture thereof and to provide a screw adjustment connection device which is perfectly free for screwthread adjustment purposes but without lost-motion in directions axially of the screw connection, whereby the latter is in effect a rigid connection device for push-pull purposes. To facilitate the nut squeezing action and to maintain the nut 70 in locked position upon the push-pull member 22 subsequent to the assembly thereof just referred to, the stub portion 48 of the push-pull member 22 is preferably slotted longitudinally as indicated at 74, and the nut 70 is provided with a flange portion 76 which is adapted to be peened into the slots 74 of the push-pull member subsequent to final adjustment of the nut 70 in position thereon.

Thus, it will be understood that the control surface actuating mechanism is adapted to be assembled by initially mounting the bearing 52 upon the screw 46 by means of the jam nuts 56. The push-pull member 22 is then threaded upon the screw 46, as to the relative position thereof illustrated by Fig. 2 of the drawing, and the nut 70 is then tightened upon the stub portion 48 of the push-pull member in such manner as to squeeze the latter into snug fitting relation upon the screw 46, in such manner as to eliminate any endwise lost motion effects therebetween but without locking the push-pull member 22 relative to the screw 46 with respect to screw threading adjustments thereof. Whenever the exact desired degree of clamping action by the nut 70 is attained the flange portion 76 thereof is peened into the slotted portions 74 of the push-pull member to fix the nut permanently upon the push-pull member. The push-pull member is then unscrewed from the screw 46 and the screw is inserted within the housing 20 to the position shown in Fig. 2. The push-pull member is then inserted in the opposite end of the housing and rotated so as to be screwed upon the screw 46 to the assembled position shown in Fig. 2.

The gland 60 may then be threaded into the end portion 62 of the housing to clamp the bearing 52 against displacement relative to the housing, whereby the entire unit is assembled relative to the housing and the latter is ready to be mounted upon the bracket 36, or whatever other mounting arrangement may be provided. The connections between the stud 26 and the control rod and horn members 30—34 may then be made, whereby the push-pull member 22 will be fixed against rotation relative to the housing 20. The effective length of the unit between the positions of the pivot axes 40—32 may be regulated at will by screwdriver adjustments of the screw 46 relative to the push-pull member. For this purpose the gland 60 may be simply removed to provide access to the head 50 of the screw.

Thus, it will be understood that subsequent to final assembly and adjustment of the mechanism rotation of the screw 46 by means of the cable device 66 will cause the push-pull member 22 to be moved telescopically relative to the housing 20 for varying the distance between the axes of the trunnion screws 40—40 and the pivot connection 32 of the trim tab horn, whereby the trim tab will be actuated for control purposes. It will be apparent that the device is adapted to be readily disassembled for adjustment or parts replacement purposes as may be required. As illustrated at 80 in Fig. 2, an annular packing is preferably provided to seal the sliding connection between the housing 20 and the push-pull member 22, and a retaining ring 82 may be employed to hold the packing 80 in place. The adjacent end portion of the housing 20 may be arranged to be deformed as illustrated at 84 subsequent to final assembly of the unit for holding the packing ring in operative position.

It will of course be understood that although only one form of the invention has been shown and described in detail, it will be apparent to those skilled in the art that the invention is not so limited but that various changes may be made therein without departing from the spirit of the invention or the scope of the appended claims.

We claim:

1. An aircraft flight control device comprising a force transmitting unit having operative elements thereof adapted to be connected to a pilot-operable member and to an aerodynamic control surface for forcing said control surface to move in response to actuation of said pilot operable member, said force transmitting unit comprising a tubular housing, means for mounting said tubular housing upon said aircraft, a screw disposed to extend axially within said tubular housing and rotatably mounted thereon and fixed against axial displacement relative thereto and adapted to be connected at one of its ends to said pilot operable member, a strut member having a body portion thereof slidably mounted within said housing to provide therewith a telescopically extensible-contractable force transmitting unit, said strut member having a reduced end portion thereof extending into said housing and centrally bored and screwthreaded into connection with said screw and externally tapered and screwthreaded, connection means carried by said strut member externally of said housing and adapted to be connected to said control surface for retaining said strut member against rotation axially of said screw and for transmitting push-pull force movements to said control surface in response to rotation of said screw, and adjustment means comprising a member bored and tapped and screwthreaded upon said externally threaded end portion of said strut member and adapted to be clamped thereon to elastically deform the latter to maintain the latter in snug lost-motion eliminating manner upon said screw throughout all control adjustment movements of said screw and of said strut member, whereby to prevent fluttering of said control surface.

2. An aircraft flight control device comprising a force transmitting unit having operative elements thereof adapted to be connected to a pilot-operable member and to an aerodynamic control surface for forcing said control surface to move in response to actuation of said pilot operable member, said force transmitting unit comprising a tubular housing, means for mounting said tubular housing upon said aircraft, a screw disposed to extend axially within said tubular housing and rotatably mounted thereon and fixed against axial displacement relative thereto and adapted to be connected at one of its ends to said pilot operable member, a strut member having a body portion thereof slidably mounted within said housing to provide therewith a telescopically extensible-contractable force transmitting unit, said strut member having a reduced end portion thereof extending into said housing and centrally bored and screwthreaded into connection with said screw and externally tapered and screwthreaded, connection means carried by said strut member externally of said housing and adapted to be connected to said control surface for retaining said strut member against rotation axially of said screw and for transmitting push-pull force movements to said control surface in response to rotation of said screw, adjustment means comprising a member bored and tapped and screwthreaded upon said externally threaded end portion of said strut member and adapted to be clamped thereon to elastically deform the latter to maintain the latter in snug lost-motion eliminating manner upon said screw throughout all control adjustment movements of said screw and of said strut member, and means adapted to key said adjustment means in position upon said strut member, whereby to prevent fluttering of said control surface.

3. An aircraft flight control device comprising a force transmitting unit having operative elements thereof adapted to be connected to a pilot-operable member and to an aerodynamic control surface for forcing said control surface to move in response to actuation of said pilot operable member, said force transmitting unit comprising a tubular housing, means for mounting said tubular housing upon said aircraft, a V-thread type screw disposed to extend axially within said tubular housing and rotatably mounted thereon and fixed against axial displacement relative thereto and adapted to be connected at one of its ends to said pilot operable member, a strut member having a body portion thereof slidably mounted within said housing to provide therewith a telescopically extensible-contractable force transmitting unit, said strut member having a reduced end portion thereof extending into said housing and centrally bored and V-thread tapped and threaded into connection with said screw and externally tapered and screwthreaded, connection means carried by said strut member externally of said housing and adapted to be connected to said control surface for retaining said strut member against rotation axially of said screw and for transmitting push-pull force movements to said control surface in response to rotation of said screw, and adjustment means comprising a member bored and tapped and screwthreaded upon said externally threaded end portion of said strut member and adapted to be clamped thereon to elastically deform the latter to maintain the latter in snug lost-motion eliminating manner upon said screw throughout all control adjustment movements of said screw and of said strut member, whereby to prevent fluttering of said control surface.

4. An aircraft flight control device comprising a force transmitting unit having operative elements thereof adapted to be connected to a pilot-operable member and to an aerodynamic control surface for forcing said control surface to move in response to actuation of said pilot operable member, said force transmitting unit comprising a tubular housing, means for mounting said tubular housing upon said aircraft, a screw disposed to extend axially within said tubular housing and rotatably mounted thereon and fixed against axial displacement relative thereto and adapted to be connected at one of its ends to said pilot operable member, a strut member having a body portion thereof slidably mounted within said housing to provide therewith a telescopically extensible-contractable force transmitting unit, said strut member having a reduced end portion thereof extending into said housing and centrally bored and screwthreaded into connection with said screw and externally tapered and screwthreaded, connection means carried by said strut member externally of said housing and adapted to be connected to said control surface for retaining said strut member against rotation axially of said screw and for transmitting push-pull force movements to said control surface in response to rotation of said screw, and adjustment means comprising a member slip-fitting into said housing and being centrally bored and tapped and screwthreaded upon said externally threaded end portion of said strut member and adapted to be clamped thereon to constrict and deform the latter to maintain the latter in snug lost-motion eliminating manner upon said screw throughout all control adjustment movements of said screw and of said strut member whereby to prevent fluttering of said control surface, said adjustment member cooperating with said housing member to maintain said strut member and said housing member in proper telescopically aligned relation.

HAROLD J. DOBMEIER.
GERALD A. WEINGARTNER.